April 29, 1947.    R. E. CUMMINGS    2,419,708
LUBRICANT CONTROLLING VALVE SPRING RETAINER LOCK
Filed Feb. 14, 1946
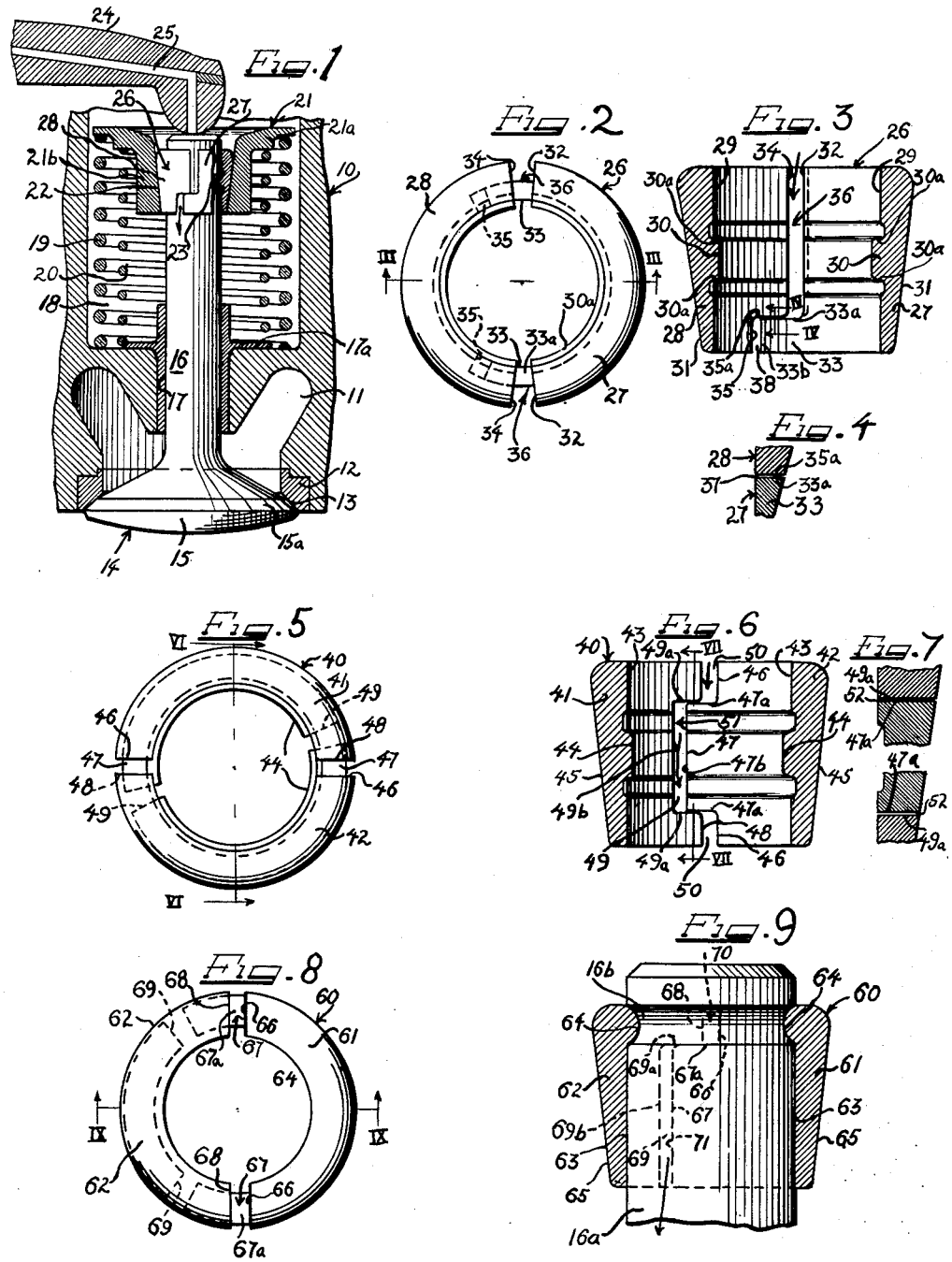
Inventor
Robert E. Cummings Patented Apr. 29, 1947

2,419,708

UNITED STATES PATENT OFFICE 2,419,708

LUBRICANT CONTROLLING VALVE SPRING RETAINER LOCK

Robert E. Cummings, University Heights, Ohio, assignor to Thompson Products, Inc., Cleveland, Ohio, a corporation of Ohio Application February 14, 1946, Serial No. 647,635

10 Claims. (Cl. 123—188)

This invention relates to valve spring retainer locks adapted to control flow of lubricant along the stem of a valve on which they are mounted.

Specifically, this invention deals with valve spring retainer locks composed of a pair of opposed cylindrical lock segments having overlapping side edges to block off free passage of lubricant between the opposed segments.

The conventional valve spring retainer locks include a pair of opposed fragmental cylindrical segments partially embracing the stem of a valve. These segments, when seated around the valve stem, have unrestricted gaps therebetween and, in valve installations where lubricant is fed to the tip end of the valve, the gaps afford unrestricted passages for flow of lubricant along the valve stem. This unrestricted flow of lubricant is frequently undesirable because excess lubricant will enter the valve stem guide and be burned in the combustion chamber controlled by the valve. Further, excess lubricant will gum the stem and guide to interfere with smooth relative sliding movements therebetween. Sticky valve operation may therefore result.

The gap between the lock segments of a valve spring retainer lock cannot be avoided, because the valve segments must be movable toward each other to create a wedge lock between the retainer and the valve stem.

In accordance with this invention, lubricant flow along the valve stem is controlled as desired by valve spring retainer locks without interfering with the wedge lock efficiency of such locks.

According to this invention, the side edges of a pair of cylindrical lock segments are equipped with overlapping local portions in close proximity to each other for defining a restricted passage between the segments which will effectively block off free flow of lubricant. These overlapping local portions afford tongue and groove joints and, if desired, these joints can have sliding fit relationship to either completely block off flow of oil, or to meter thin films of oil therebetween.

In some forms of this invention, the locks are made in male and female pairs with the male lock having one or more projecting tongues slidably projecting into one or more recesses in the female lock.

In other forms of this invention each lock will be composed of identical segments with one edge of each lock having a projecting tongue and the other edge of each lock having a recess. When the locks are mounted on a valve stem, the tongues will project into the recesses to provide the restricted lubricant flow passages between the locks without interfering with movement of the segments toward and away from each other.

It is, then, an object of this invention to provide lubricant-metering valve spring retainer locks.

Another object of the invention is to provide valve lock segments with interfitting tongues and grooves along their opposed side edges.

A still further object of this invention is to provide valve lock segments with overlapping local side edges.

A still further object of this invention is to provide a valve spring retainer lock composed of male and female lock segments wherein the male segment has tongues projecting from its side edges and wherein the female segment has recesses for receiving said tongues in overlapping relation.

A further object of the invention is to provide a valve lock composed of identical segments each of which has a tongue projecting from one side edge and a recess in the other side edge.

Other and further objects of the invention will be apparent to those skilled in the art from the following detailed description of the annexed sheet of drawings which, by way of preferred examples only, illustrate several embodiments of the invention.

On the drawings:

Figure 1 is a vertical section, with parts in elevation, of a portion of an engine cylinder head, showing a poppet valve equipped with a valve spring retainer lock according to this invention.

Figure 2 is an enlarged top plan view of the valve lock shown in Figure 1.

Figure 3 is a vertical cross-sectional view taken along the line III—III of Figure 2.

Figure 4 is a fragmentary enlarged vertical cross-sectional view taken along the line IV—IV of Figure 3.

Figure 5 is a view similar to Figure 2, but illustrating a modified form of valve lock according to this invention.

Figure 6 is a vertical cross-sectional view taken along the line VI—VI of Figure 5.

Figure 7 is an enlarged fragmentary vertical cross-sectional view taken along the line VII—VII of Figure 6.

Figure 8 is a view similar to Figures 2 and 5, but illustrating another modified form of this invention.

Figure 9 is a vertical cross-sectional view taken along the line IX—IX of Figure 8 and additionally showing a portion of a valve stem embraced by the retainer lock.

As shown on the drawings:

In Figure 1 the reference numeral 10 designates a portion of an internal combustion engine having a port 11 with a valve seat insert 12 around the mouth thereof providing a seat 13. A poppet valve 14 has a head 15 for opening and closing said port. The head 15 has a seating face 15a adapted to engage the valve seat 13. The valve 14 has a cylindrical stem 16 extending from the head 15 and slidably mounted in a valve stem guide 17 carried by the engine part 10. A well 18 is provided in the engine part 10 above the part 11 and the valve stem 16 extends through this well.

A spring assembly comprising an outer coil spring 19 bottomed on the bottom of the well 18 and an inner coil spring 20 bottomed on a flange 17a of the guide 17 is mounted in the well 18.

A spring retainer 21 surrounds the tip end of the valve stem 16 and has an outturned flange 21a acted on by the upper end coils of both springs 19 and 20. A skirt or collar portion 21b of the retainer 21 depends from the flange 21a into the inner coil spring 20 and defines a tapered bore 22 surrounding the valve stem 16 in spaced relation. The bore converges toward the head 15 of the valve.

The valve stem 16 has a peripheral groove 23 adjacent its tip end. This groove 23 has a flat bottom wall and spaced opposed radially extending shoulders.

A rocker arm 24 acts on the tip end of the valve to open the valve against pressure of the springs 19 and 20 and to permit the valve to close. A lubricant-conveying passageway 25 is formed through the rocker arm and discharges at the tip end of the valve.

In accordance with this invention, a valve spring retainer lock 26 is provided between the retainer 21 and the stem 16 of the valve to lock the retainer on the valve stem. This lock 26, as best shown in Figures 2 and 3, is composed of fragmental cylindrical lock segments including a male segment 27 and a female segment 28. The segments have cylindrical inner walls 29 to partially embrace the cylindrical valve stem 16. A rib or bead 30 projects radially inward from an intermediate portion of the inner wall 29 of each segment. This bead 30 is adapted to fit into the groove 23 of the valve stem, but is preferably of less depth than the stem groove, so that its inner face will be spaced radially outward from the bottom of the valve groove. The bead provides opposed shoulders 30a for engaging the shoulders or side walls of the groove 23.

Each valve segment 27 and 28 has a tapered outer wall 31 to snugly fit the tapered bore 22 of the retainer 21.

The male segment 27 has axially extending side edges 32 continuing from the top or thick end of the segment to the top edges 33a of circumferentially extending tongues or tabs 33 at the bottom of the segment. These tongues 33 extend beyond the side walls or edge 32 to edges 33b parallel with the edges 32 but circumferentially offset therefrom.

The female segment 28 has side edges 34 which extend longitudinally of the segment to the top edges 35a of recesses or grooves 35 formed in the segment adjacent the lower end thereof.

When the lock 26 embraces the valve stem 16, the edges 32 and 34 of the segments 27 and 28 are in spaced opposed parallel relation and longitudinally extending gaps 36 are thereby provided between the segments. These gaps will accommodate free flow of oil along the valve stem through the retainer. However, in accordance with this invention, the gaps are blocked off by the close interfitting relationship between the top edges 33a of the tongues 33 and the top edges 35a of the recesses 35. These edges are always in overlapping relationship.

The recesses 35 are circumferentially deeper than the tongues 33 so as not to interfere with the wedge function of the lock between the retainer and valve stem. In other words, deep recesses permit the gaps between the lock segments to become narrower.

As shown in Figure 4, a metering passage 37 of controlled flow capacity is provided between the edges 33a and 35a. This passage 37 will meter lubricant from the gap 36 to the gap 38 between the extremity of the tongue 33 and the back wall of the recess 35. If desired, the edges 33a and 35a can be in engagement to entirely stop the flow of lubricant along the valve stem between the lock segments.

The valve lock 40 in the embodiment of the invention shown in Figures 5 and 6 includes identical fragmental cylindrical segments 41 and 42 with cylindrical inner walls 43 having inwardly projecting beads 44 intermediate their ends, and with tapered outer walls 45. One edge 46 of each segment has a peripherally extending tongue portion 47 intermediate the top and bottom of the segments. The other edge 48 of each segment has a circumferentially extending recess 49 intermediate the top and bottom of the segments. The tongues 47 have top and bottom walls 47a extending in parallel planes normal to the axis of the segments. The recesses 49 have top and bottom walls 49a parallel with said walls 47a and arranged to overlap the walls 47a without interfering with movement of the segments toward and away from each other.

The tongues 47 have side edges 47b parallel with the edges 46a of the segments but peripherally offset from said edges 46. The recesses 49 have inner or back walls 49b parallel with the walls 48 of the segments but circumferentially offset from these walls. When the segments 41 and 42 are disposed around a valve stem, the side edges or walls 46 and 48 are in spaced opposed relation to define gaps 50 at the top and bottom of the lock. The side walls or edges 47b and 49b are also in spaced opposed relation to define gaps 51, therebetween. Oil can flow freely through the gaps 50 and 51. However, in order for oil to flow between the gaps 50 and 51, it must pass between the closely disposed edges 47a and 49a through metering passages 52 shown in Figure 7. These metering passages 52 can be of any desired capacity to restrict flow of oil and thereby control lubrication of the valve stem 16 from the passageway 25 of the rocker arm 24. Thus, in order for oil to travel down the valve stem 16, it is necessary that this oil pass through two metering passageways 52. If desired, of course, flow of oil can be entirely eliminated by having the edges 47a and 49a in intimate contact to close one or both of the passages 52.

The recesses 49 are deeper than the projecting lengths of the tongues 47 so that, as explained above, the valve segments can move toward and away from each other without interference.

In the embodiment of the invention shown in Figures 8 and 9, the valve lock 60 is composed of male and female segments 61 and 62 similar to the segments of the valve lock 26 disclosed in Figures 1 to 3. However, the lock 60 is arranged for use with a valve stem 16a having a round groove 16b adjacent the tip end of the stem. The segments 61 and 62 have cylindrical inner walls 63 with a rounded bead 64 projecting inwardly at the top end of the segments for seating in the valve groove 16b. The outer walls 65 of the segments are tapered to fit the bore 22 of the retainer 21. The side edges 66 of the male segment extend from the top end of the segment to a level adjacent the bottom of the bead 64. At this level circumferentially extending tongues 67 project forwardly from the edges 66. These tongues continue to the bottom of the segment. Each tongue 67 thus has a top wall 67a extending forwardly from the edge 66 in a plane normal to the axis of the segment.

The female segment 62 has side edges 68 at the top or bead end of the segment. Open bottomed recesses 69 extend from the bottom of the bead 64 through the bottom of the segment. These recesses have top walls 69a overlapping the walls 67a of the tongues 67. The recesses also have back walls 69b parallel with the edges of the tongues 67 in spaced relation therefrom to accommodate movement of the segments toward each other.

The lapping relationship of the walls 67a and 69a provides metering passages connecting the gaps 70 between the side walls 66 and 68 with the gaps 71 between the tongues 67 and back walls 69b of the recesses. Flow of oil along the valve stem 16a is thereby metered or stopped, as desired.

The beads 30, 44, and 64 of the above-described locks 26, 40, and 60 seat in grooves 23 or 16b in the valve stems 16 or 16a to engage groove shoulders or curved groove portions, and are effective to hold the lock segments against relative axial shifting that might cause variation of the metering capacity of the gaps between the lapped portions of the segments.

From the above descriptions it will be understood that this invention provides valve spring retainer locks with lapping edge portions adapted to meter lubricant flow between the lock segments, and thereby control lubricant flow on a valve stem embraced by the segments.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a valve assembly including a poppet valve with a cylindrical stem having a peripheral groove near the tip end thereof, a valve spring retainer having a tapered bore loosely embracing the tip end of the valve stem and diverging toward the tip end of the stem to extend beyond said tip end, and means for feeding lubricant to the tip end of the stem, the improvement of a pair of opposed cylindrical internally beaded lock segments in the bore of the retainer embracing a portion of the valve stem and having the bead portions extending into the stem groove, and said segments having spaced opposed side edges with localized overlapping portions in close proximity adapted to block free flow of lubricant along the valve stem.

2. In combination with a valve having a peripherally grooved stem and a valve spring retainer having a tapered bore loosely embracing the valve stem, opposed locking segments embracing a portion of the valve stem seated in the bore of the retainer and having internal beads in the peripheral groove of the stem, complementary tongues and grooves on the side edges of the locking segments, and said tongues and grooves having lapped wall portions in close proximity to block off free flow passage along the valve stem between the segments.

3. In a valve assembly including a valve with a peripherally grooved stem, a valve retainer having a tapered bore loosely embracing said stem, and means for feeding lubricant into said retainer, the improvement of opposed cylindrical locking segments wedged in the tapered bore of the retainer and partially embracing the valve stem, said segments having beads seated in said groove of said stem, said segments having spaced opposed side edges with lubricant-conveying gaps therebetween, and complementary lapping wall portions on said side edges for metering flow of lubricant along the valve stem through said gaps.

4. A valve spring retainer lock adapted to meter controlled amounts of lubricant along a valve stem which comprises a pair of opposed lock segments having spaced opposed side edges with lapping local portions in close proximity defining a restricted lubricant passage adapted to block off free flow of lubricant.

5. A valve lock comprising complementary male and female fragmental cylindrical segments, said male segment having peripherally extending tongues beyond the side edges thereof, said female segment having tongue-receiving recesses extending inwardly from the sides thereof, and said tongues and recesses having opposed walls in close proximity defining therebetween metering lubricant-conveying passages.

6. A valve lock comprising complementary male and female cylindrical segments, said male segment having side edges with localized tongues projecting peripherally therefrom and having top walls lying in planes normal to the axis of the segment, said female segment having side edges with inwardly extending recesses for receiving said tongues, said inwardly extending recesses having top walls parallel with the top walls of the tongues and lying in close proximity thereto for blocking off free flow of fluid between the segments.

7. A valve lock comprising complementary male and female fragmental cylindrical segments having cylindrical inner walls with inwardly projecting beads intermediate their ends and tapered outer walls converging toward one end, said male segment having side edges extending from one end of the segment to a peripherally extending wall spaced from the other end of the segment and lying in a plane normal to the axis of the segment, said female segment having side edges opposing the edges of the male segment in spaced parallel relation and a recess for receiving the peripherally extending wall of the male segment, and said recess and peripherally extending wall of the male segment lying in close proximity to meter fluid flow through the gaps between the side edges of the segments.

8. A valve lock comprising a pair of identical fragmental cylindrical segments having opposed side edges, one of said edges of each segment having a peripherally extending tongue portion, the other edge of each segment having a peripherally extending tongue-receiving recess therein, said recesses receiving said tongues and having opposed wall portions in close proximity to said tongues for defining restricted flow passages.

9. A valve lock comprising a pair of identical generally cylindrical segments, each segment having a projecting tongue on one edge thereof and a recess in the other edge thereof, the tongues of one segment extending into the recesses of the other segment to provide opposed lapping wall portions defining a restricted passage between the segments irrespective of the size of the gaps between the segments.

10. A valve spring retainer lock comprising a pair of opposed fragmental cylindrical segments having internal beads at one end thereof, one of said segments having side edges with peripherally extending tongue portions, the other of said segments having side edges with tongue-receiving recesses, and the tongues of one segment lapping the recesses of the other segment to define restricted flow passages between the segments.

ROBERT E. CUMMINGS.

REFERENCES CITED

The following references are of record in the file of this patent:

UNITED STATES PATENTS

| Number | Name | Date |
|---|---|---|
| 1,251,003 | Fornaca | Dec. 25, 1917 |
| 1,950,222 | Buckley | Mar. 6, 1934 |
| 2,112,832 | Douglas et al. | Apr. 5, 1938 |
| 2,123,681 | Willgoos | July 12, 1938 |
| 2,397,502 | Ralston | Apr. 2, 1946 |